United States Patent

Kegelman

[15] 3,639,174

[45] Feb. 1, 1972

[54] VOLTAIC CELLS WITH LITHIUM-ALUMINUM ALLOY ANODE AND NONAQUEOUS SOLVENT ELECTROLYTE SYSTEM

[72] Inventor: Matthew R. Kegelman, Wilmington, Del.

[73] Assignee: E. I. du Pont de Nemours and Company, Wilmington, Del.

[22] Filed: Apr. 22, 1970

[21] Appl. No.: 28,292

Related U.S. Application Data

[63] Continuation of Ser. No. 744,916, July 15, 1968, abandoned.

[52] U.S. Cl. ................................136/20, 136/6, 136/100, 136/155
[51] Int. Cl. .............................................H01m 35/02
[58] Field of Search.....................136/6, 83, 20, 100, 155

[56] References Cited

UNITED STATES PATENTS

| | | | |
|---|---|---|---|
| 3,393,093 | 7/1968 | Shaw et al.................................. | 136/6 |
| 3,413,154 | 11/1968 | Rao.................................. | 136/100 R |
| 3,415,687 | 12/1968 | Methlie............................. | 136/100 R |
| 3,428,493 | 2/1969 | Adams.............................. | 136/100 R |
| 3,532,543 | 10/1970 | Nole et al. ........................ | 136/6 |
| 3,043,896 | 7/1962 | Herbert et al..................... | 136/6 |
| 3,110,630 | 11/1963 | Wolfe, Jr. ......................... | 136/6 |
| 3,185,590 | 5/1965 | Mayer et al....................... | 136/6 |
| 3,380,855 | 4/1968 | Mahy et al......................... | 136/100 |
| 3,423,242 | 1/1969 | Meyers et al. .................... | 136/100 |

*Primary Examiner*—Winston A. Douglas
*Assistant Examiner*—C. F. Lefevour
*Attorney*—Francis J. Crowley

[57] ABSTRACT

Half cells comprised of a lithium aluminum alloy anode and a lithium hexafluorophosphate-inert nonaqueous solvent electrolyte; and voltaic cells utilizing such half cells with compatible cathodes, particularly elemental sulfur and reversibly reducible iron, nickel and copper compounds having a solubility in the electrolyte solvent at 25° C. of less than 200 p.p.m. by weight, such voltaic cells being useful as primary and/or secondary batteries.

15 Claims, 3 Drawing Figures

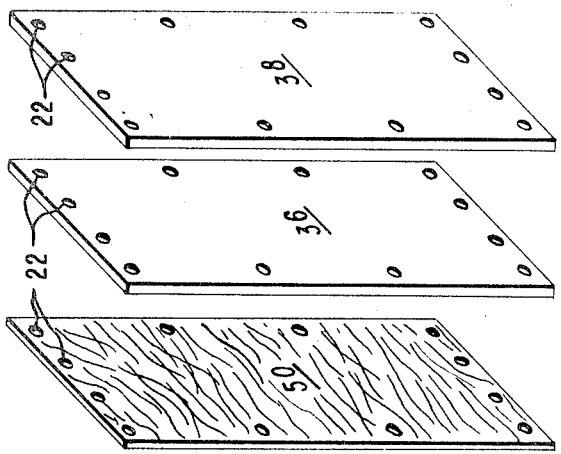
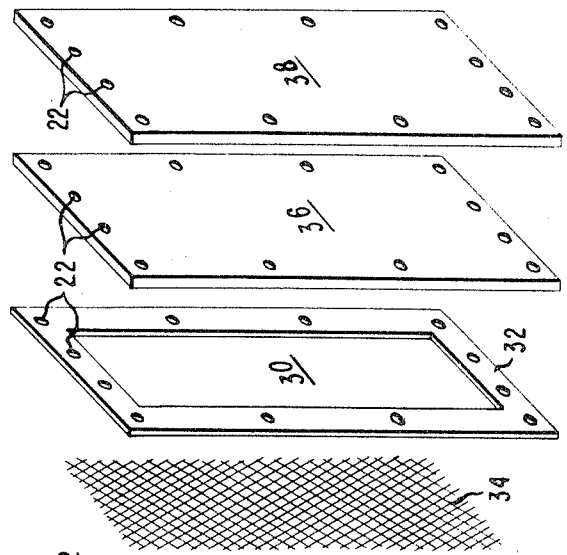
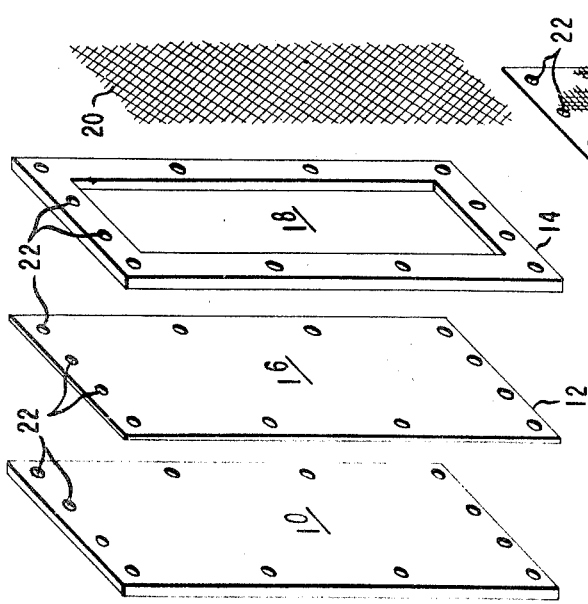

VOLTAIC CELLS WITH LITHIUM-ALUMINUM ALLOY ANODE AND NONAQUEOUS SOLVENT ELECTROLYTE SYSTEM

This is a continuation of Ser. No. 744,916, filed July 15, 1968, now abandoned.

This invention relates to half cells comprising a lithium-aluminum alloy anode and a lithium hexafluorophosphate-inert nonaqueous solvent electrolyte, and to complete voltaic cells utilizing such half cells which are useful as primary and/or secondary batteries.

BACKGROUND

Lithium and other light metals of groups IA and IIA of the periodic table attract attention as anodes because they combine high potentials with low atomic weights. The prior art has proposed many cells involving such high-energy density anodes, but few are entirely satisfactory for use as batteries. One difficulty has been to find suitable electrolytically compatible combinations that meet the primary requirement that the electrolyte, including the solvent, be inert towards and be a nonsolvent for the active species of the anode (reductant) and the cathode (oxidant). Such inertness is necessary so as not to deplete the active ingredient supply or introduce impurities into the electrolyte which shorten cell life or otherwise interfere with its operation; and not to short the cell through direct chemical reaction across the electrolyte (as opposed to the desire indirect electrochemical reaction through an external circuit).

To minimize such difficulties, permselective partitions have been suggested for segregating the anodic half cell from the cathodic half cell. This, however, necessarily increases cell resistance which is a serious drawback, except in low-drain battery uses.

As the prior art high-energy density cells are in general difficult to charge once they are discharged, or are greatly limited in the number of times they can be recharged, a further problem has been to find high-energy systems that not only are chemically inert to a high degree but are electrochemically reversible with high efficiency.

It is accordingly among the objects of this invention to provide a half cell with a lithium-aluminum alloy anode and a nonaqueous solvent-electrolyte system which is compatible with the anode. A further object is to utilize such half cells for preparing complete voltaic cells having good stability against self discharge, good discharge characteristics under load and a high degree of reversibility.

BRIEF SUMMARY OF THE INVENTION

These and other objectives are achieved in the present invention by:

I. Half cells comprised of
   A. a lithium-aluminum alloy anode having a reduction potential of at least about 0.2 volt less than lithium metal; and
   B. an electrolyte of a substantially neutral (i.e., pH in water of from about 6 to about 8), inert solvent containing lithium hexafluorophosphate in an amount sufficient to provide a conductivity of at least about 0.001 ohm$^{-1}$cm.$^{-1}$; and II. Complete voltaic cells comprising half cells as defined in I. and
   C. a compatible cathode which preferably is a reversibly reducible cathode whose solubility in said electrolyte solvent at 25° C. is less than about 200 p.p.m. by weight. Particularly useful are elemental sulfur and reversibly reducible iron, nickel and copper compounds having low solubility as defined above.

The cathode is preferably present as either

1. An electrically conductive paste having at least one of the cathode depolarizers in particulate form, particulate conductive carbon black and lithium hexafluorophosphate electrolyte as defined above, the paste being in contact with a conductor;

2. A porous, electrolyte permeable, sheetlike structure comprised of a mixture of at least one of the cathode depolarizers in particulate form, a particulate electrical conductor such as carbon black and a normally solid, electrolyte insoluble, electrochemically inert polymeric filler such as polytetrafluoroethylene in an amount to form a self-supporting sheet, the sheet being in contact with a metal conductor; or 3. A self-supporting structure of ferrous sulfide which, since ferrous sulfide is conducting, provides both cathode depolarizer and conductor.

These and other embodiments are explained in more detail below.

BRIEF DESCRIPTION OF DRAWINGS

FIG. 1 is an exploded view of a typical anode assembly and electrolyte compartment;

FIG. 2 is an exploded view of a typical cathode assembly adapted to utilize a paste cathode; and FIG. 3 is an exploded view of a typical cathode assembly utilizing a sheet-type cathode.

DETAILED DESCRIPTION OF THE INVENTION

Basis for the Invention

This invention is based on the discovery that a half cell of a lithium-aluminum alloy anode and lithium hexafluorophosphate in a suitable, inert, substantial neutral, solvent constitutes a particularly effective component for complete high-energy voltaic cells. Preferred complete cells and superior cell performance and stability against self-discharge are obtained when such half cells are used with conductive cathode systems, i.e., cathode depolarizers (in electrical contact with conductive materials when the cathode depolarizer is insufficiently electrically conductive itself to serve as the complete cathode), which are substantially insoluble in the electrolyte. The half cells can be used, however, with any suitable cathodes. If necessary, membrane separation of the half cell and cathode can be used.

When employed with reversible lithium anodes (such as lithium deposited on aluminum and most preferably the hereinafter described lithium-aluminum alloys), such combinations constitute high-energy cells with desirable recharge characteristics. For example, they typically show open circuit voltages of about 3 volts, can be recharged 10 or more times, exhibit total discharge lifetimes to a 1.0 volt level of at least 150 minutes and coulombic discharge/charge efficiencies of at least 50 percent. In other words such invention cells are suitable for secondary (rechargeable) battery use.

In contrast use of (a) other alkali metal hexafluorophosphates and other lithium salts as solutes, (b) other metal compounds (metal halides) as the cathode oxidants, (c) less neutral solvents (acetic anhydride, isopropylamine), and other lithium anodes (bulk lithium) gives cells with much inferior secondary cell performance.

The Electrolyte

Lithium hexafluorophosphate, LiPF$_6$, is available commercially and may be used as purchased. It may also be prepared by mixing lithium fluoride and phosphorus pentafluoride in a suitable solvent, including solvents as defined above and exemplified more fully below. If desired the LiPF$_6$ may be prepared in situ in the electrolyte solvent. While the lithium solute is critical for cell reversibility, small minor, proportions (say up to 10 mole percent) of other alkali metal hexafluorophosphates, hexafluoroarsenates, perchlorates, thiocyanates and the like may also be present, although it is preferred they be substantially absent.

The electrolyte solvent may vary widely provided it dissolves sufficient lithium hexafluorophosphate for practical conductivities, is essentially a nonsolvent for lithium metal and for the metal cathode compound, is chemically inert to the above electrochemical reactants and other cell constituents, and is substantially electrochemically inert during cell operation, i.e., neither oxidized nor reduced during cell discharge and charge.

Conductivities are desirably at least 0.001 ohm$^{-1}$cm.$^{-1}$, the higher the better to minimize the internal resistance and heat buildup within the cell.

Representative solvents which are suitably inert and neutral, that is exert a pH when mixed with water not lower than 6 and not higher than 8, include N,N-dimethyl formamide, N,N-dimethyl acetamide, acetonitrile, propylene carbonate, dimethyl sulfoxide, and the like compounds. Still others which may be used include butyrolactone, nitromethane, dimethyl carbonate, methyl acetate, methyl formate and diethylene glycol dimethyl ether.

Not included are lithium-reactive protic solvents such as water and alcohol, basic solvents such as ammonia and alkyl amines, and acid solvents such as the carboxylic acids and their anhydrides.

LiPF$_6$ in dimethyl formamide (DMF) constitutes the preferred electrolyte for its high conductivity, and for its contribution to the discharge efficiency and reversibility of the overall cell. LiPF$_6$ shows high solubility in DMF (up to 37 percent by weight at about 25° C.) Preferred concentrations range from about 15 to 24 percent by weight where conductivity is at least $1\times10^{-3}$ ohm$^{-1}$cm.$^{-1}$, more preferably about 20 percent where conductivity is about $2\times10^{-2}$ ohm$^{-1}$cm.$^{-1}$.

The Cathode

The cathode depolarizer may vary widely provided it is the oxidant member of an electrochemically reversible redox couple; i.e., where the oxidized moiety, e.g., $Cu^{II}$, $Cu^{I}$, $Fe^{II}$, $Ni^{II}$ or $S°$ is reversibly reducible to and oxidatitively regeneratable from the lower valent moiety, e.g., $Cu^{I}$, $Cu°$, $Fe°$, $Ni°$ or $S^{--}$. The anions associated with the above cations are not critical so long as they are inert to the rest of the system. Inertness is enhanced and unnecessary electrolyte dilution with cathode solutes avoided when cathode materials and the depolarizer are insoluble. Electrolyte solubilities of the metal cathode materials should be less than 200 p.p.m. by weight and preferably less than 100 p.p.m. Preferably, too, the lithium salts of the cathode depolarizer anions should be less soluble than 0.5 percent by weight (still better less than 0.2 percent) to avoid adding unnecessary solutes to the electrolyte. Solubility is not as critical with elemental sulfur as the cathode depolarizer.

The particular copper cathode depolarizer employed depends largely on the electrolyte solvent. Representative copper compounds which are particularly satisfactory for use with the preferred LiPF$_6$·DMF electrolyte include cuprous oxide, cupric oxide, cuprous carbonate, basic cupric carbonate, cupric ferrocyanide, cuprous sulfide, cupric sulfide and mixtures thereof. Particularly preferred are cupric sulfide, cuprous oxide and basic cupric carbonate. Electrolyte-insoluble cuprous and cupric organic compounds having the above desirable properties may also be employed, for example, cupric salts such as cupric oxalate and salts of such polybasic, alpha-hydroxy carboxylic acids as tartaric, citric and saccharic acid. Such cupric compounds must be insoluble in the electrolyte solvent and satisfactorily reducible as cathode depolarizers. Copper salts of polymeric acids such as carboxylic and sulfuric acid type exchange resins may also be used. Noncopper compounds such as ferrous sulfide, nickel sulfide, nickel fluoride, nickel oxalate and elemental sulfur are also very effective, useful cathode depolarizers.

It will be understood that the possible cathode depolarizer exchange products, viz, the hexafluorophosphates of copper, iron and nickel may also be employed. Such products may be formed in situ by reaction of lithium hexafluorophosphate with either the initially employed cathode depolarizer or its lower valent discharge product. Since the discharged cell electrolyte contains substantially nil metal, it appears that the hexafluorophosphates if formed are substantially insoluble therein.

When the oxidant (i.e., cathode depolarizer) is insufficiently electrically conductive itself to serve as the complete cathode, it is used in combination with a conductive carbon or other conductor such as copper, iron, nickel or other conductive inert metal. The cathodes may be in the form of pastes or composites, which may include inert fillers or binders, and may be fabricated according to known techniques. Such structures, as is well known to the art, should be sufficiently porous to enable the electrolyte to intimately contact the oxidant and at the same time should be sufficiently compacted so as to ensure good electrical contact between the oxidant and the conductor which serves essentially to receive and transmit electrons from and to the external circuit.

Paste electrodes are conveniently prepared by mixing the particulate cathode depolarizer, a particulate conductor and the electrolyte in proportions sufficient to provide a conductive paste, pressing the mix onto a supporting grid, which may or may not be an electrical conductor. If necessary, excess electrolyte solvent may be removed as by evaporation to obtain the desired paste consistency. In general the cathode depolarizer and the conductor each amount to at least 1 percent by weight of the paste and together make up to 50 percent, while the electrolyte solution composes from 50 to 90 percent by weight.

Sheet electrodes are prepared by mixing about 15-25 volume percent polytetrafluoroethylene or other plastic that can be shaped under pressure, 30-75 volume percent carbon black or other conductive solid, and 5-35 volume percent cathode depolarizer, wetting with an inert volatile solvent such as a naphtha, intimately mixing, as in a Waring blender, and filtering to give a wet filter cake. The filter cake is worked on a rubber mill to compact it, with the rollers heated above the polymer's transition temperature (at 55° C. for polytetrafluoroethylene) to avoid shredding. The sheet is milled and the roller opening is progressively decreased as the solvent evaporates and the sheet gains structural strength. Normally in milling the roller opening is initially at twice the desired final thickness. The final sheet is folded, the mill opening is set at twice the final sheet thickness and is progressively decreased by halving the roller opening for each new pass. To impart additional tensile strength to the polytetrafluoroethylene sheet, the roller temperature is raised to 165° C. and the sheet is milled according to the above procedure until the final thickness is 0.05 to 0.1 cm. To further increase tensile strength the sheet may be sintered at 340°-360° C. for 45-60 minutes.

Whatever the cathode composition, it is preferred that it be in electrical contact, at its side away from the anode, with a metal or other conductive material. For copper cathode depolarizers, copper sheet or screen is the preferred cathode conductor (or conductor cathode). For ferrous sulfide, an iron sheet or screen is operable, but a platinum, stainless steel or like inert material is preferable. It will be appreciated that since FeS is itself a conductor, no backup plate or screen is necessary (i.e., a porous, rigid sheet of ferrous sulfide itself will be adequate). Nickel compounds are preferably used with nickel screen or sheet. Elemental sulfur may be mixed with carbon black (pasted as above) and applied to an iron plate or screen, graphitized cloth or like conductive material.

The Anode

For primary cell operation the active anode need only be lithium which, though itself conductive, may be in contact with another conductor such as aluminum, tungsten, stainless steel, platinum, nickel or silver in the form of a sheet or screen which serves to electrically connect the anode to the external circuitry. The lithium hexafluorophosphate-metal cathode system of this invention however is particularly designed for use with rechargeable lithium anodes. It is preferred to use lithium anodes comprising lithium alloyed with aluminum and containing from 1 to about 20 percent by weight of lithium, preferably 5 to 16 percent. The alloys may be prepared by fusing lithium and aluminum together or electrochemically prepared by electrolytically reducing lithium ions on an aluminum cathode. The electrodeposition electrolyte may be any inert solvent including those described above for use as electrolyte in this invention. Conveniently the anion of the lithium salt lithium source is such that it oxidizes at the anode while lithium is reductively depositing at the cathode. In such system the cathode and anode are separated by an ion-permeable membrane or an electrolyte porous separator to prevent the anodic oxidation product from contacting the lithium deposit. N,N-dimethylformamide containing about 10 weight percent lithium bromide is particularly satisfactory for electrodeposition at current densities up to about 10 ma./cm.$^2$. The aluminum sheet substrate may be plate or foil but should not be too thin. Thin sheets tend to crumble during electrodeposition possibly owing to Li-Al alloy formation. Satisfactory results are obtained with sheets 0.025-0.05 cm. thick. Thicker sheets may be employed if desired. The electrodeposition is normally continued until the lithium deposit thickness is at least about 0.001 cm. (preferably at least 0.005 cm.) and usually not more than about 0.05 cm.

It appears that the electrodeposited lithium is not merely physically adhered to the aluminum, but is actually alloyed therewith, as evidenced by the fact that the reducing potential of lithium electrodeposited on aluminum is consistently less than that of pure lithium metal. This difference in reduction potential reflects the bonding energy between the lithium and aluminum.

At 25° C. and in an electrolyte of 20 weight percent lithium hexafluorophosphate in N,N-dimethylformamide, the preferred electrodeposited lithium-aluminum anode is at least about 0.2 volt less reducing than lithium metal when both such anodes are evaluated against a saturated calomel electrode.

Considering the electrochemical reactants, the overall cell reaction requires one to two lithium atoms per oxidant (cathode depolarizer). At least 1.5 lithiums are preferred for each oxidant valence. Thus, three lithium atoms are preferred for $Cu^{II}$, $Fe^{II}$, $Ni^{II}$ and $S°$, while 1.5 are preferred for $Cu^{I}$. Although it is not critical, such lithium to oxidant atom ratio preferably does not exceed 10:1. In general, both anode and cathode project the same electrode area.

Cell dividers such as ion-permeable membranes or electrolyte-porous separators, while not necessary in the invention cells, may sometimes by advantageously employed as, for example, to further minimize contact between the anode and cathode active ingredients through the common electrolyte.

DRAWINGS—CELL PREPARATION

The invention may be further illustrated by reference to the drawings. Dimensions are not critical but are given for purposes of illustrating a typical embodiment.

With reference to FIG. 1, which shows a typical lithium anode assembly and electrolyte compartment, outer plate 10 is suitably aluminum (0.32×12.7×12.7 cm.). Anode 12 is an aluminum sheet (0.05–0.10×12.7×12.7 cm.) coated with a lithium electrodeposit 0.0025–0.0050 cm. thick. Gasket 14 (0.64×12.7×12.7 cm.) is typically silicon rubber but may be any inert insulating and gasketing material, such as polyethylene, polytetrafluoroethylene, or nonconductive neoprene. The gasket (14) serves to space and insulate the anode lithium surface 16 from the cathode assembly (described in FIGS. 2 and 3) and to provide electrolyte chamber 18 (0.64×10.2×10.2 cm.). Reticulated polyethylene, comprising two layers of 1 mm. diameter strands, 2.4 strands to the cm., with the strands crossing at 90° and forming a unitized network, conveniently serves as spacer 20, sized to fit within chamber 18 and designed to prevent the cathode surface (described below) from contacting anode surface 16.

The FIG. 2 cathode assembly, adapted to contain a conductive cathode paste (not shown) within chamber 30, includes gasket 32 (identical to gasket 14 of FIG. 1); reticulated grid 34 (identical to spacer 20 of FIG. 1); copper plate 36 backed by plate 38 (identical to plate 10 of FIG. 1), plate 36 forming the conductive backwall of the cathode paste compartment; and screen 40, nylon mesh with 0.0043 cm. openings, porous to electrolyte, which serves to retain the cathode paste within chamber 30.

The FIG. 3 sheet cathode assembly is identical to that of FIG. 2 except that sheet cathode 50 replaces screen 40, grid 34 and gasket 32. Cathode 50 typically comprises a mixture of particulate cathode depolarizer, particulate conductive carbon and particulate polytetrafluoroethylene, which had been worked on a rubber mill to provide an electrically conductive, electrolyte-porous sheetlike structure as described above.

As shown in FIGS. 1, 2 and 3, each of items 10, 12, 14, 40, 32, 36, 38 and 50 contain 12 bolt holes (designated 22) perimetrically arranged to accommodate machine screw assemblies which conveniently are threaded insulating plastic bolts and nuts (not shown).

To assemble the cell, FIG. 1 anode-electrolyte compartment system is coupled with a FIG. 2 cathode assembly in the order 10, 12, 14, 20, 40, 34, 32, 36 and 38 (cathode paste cell) or with a FIG. 3 cathode assembly in the order 10, 12, 14, 20, 50, 36 and 38 (cathode sheet cell) and the whole is bolted together with the plastic nuts and bolts to provide single compartment cells of this invention. Alternatively, the cell elements are clamped, cemented or otherwise held together by suitable means.

EXAMPLES

The following examples describe the invention in further detail. These examples are intended to be merely illustrative of the invention and not in limitation thereof. All parts are by weight unless otherwise indicated.

Example 1

Anode Preparation

Lithium was plated on a 0.32×12.7×12.7 cm. aluminum sheet electrode from a 10 percent weight LiBr-dimethylformamide solution at 10 ma./cm.$^2$ for 1 hour in a cell divided by a cation exchange ("Amfion" C-310) membrane. The plated electrode, removed from the electrolyte, was stored in a dry argon atmosphere.

Copper Sulfide Paste Cathode 75 parts of a 20 weight percent $LiPF_6$ (lithium hexafluorophosphate) in dimethylformamide solution was added with stirring under dry argon to a mixture of 12 parts of copper sulfide powder and 12 parts of a conductive furnace black (Cabot Corp. "Vulcan" XC72) to form a paste, which was then spread on a polyethylene grid having the dimensions given in the FIG. 2 description.

Cell Assembly and Loading

The above anode and paste cathode were assembled in a dry argon atmosphere together with other elements as described for FIGS. 1 and 2. A 20 weight percent $LiPF_6$-dimethylformamide solution, 14 parts ($2\times10^{-2}$ ohm$^{-1}$cm.$^{-1}$ conductivity) was injected via a hypodermic syringe through the wall of gasket 14 into chamber 18 to complete the voltaic cell. Alternatively, for cell loading, two glass tubes are inserted through the gasket 14 wall, one for admitting electrolyte, the other for displacing cell atmosphere during loading. The tubes are sealed after the electrolyte is loaded.

Cell Performance

Thus prepared, the cell shows a 3.00 open circuit voltage (OCV) and the following discharge and recharge characteristics under the following conditions designed to test secondary cell capability:

The cell was discharged under load at a constant 200 milliampere current drain until the cell voltage fell to 1.5 volts. The cell was then immediately recharged at 200 ma. until a 3.5 volt cutoff voltage was reached, whereupon the discharge at 200 ma. to the 1.5 volt cutoff was repeated, completing the first charge/discharge cycle, which in this example required about 60 minutes. Such operation was continued through consecutive charge/discharge cycles until the time for effecting a complete charge/discharge cycle became less that 2 minutes. Typical results are tabulated below:

Charge/Discharge Performance

Li/LiPF$_6$·DMF/CuS Cell

| | |
|---|---|
| Open circuit voltage, volts | 3.00 |
| Total number of charge/discharge cycles before failure | 31 |
| Total discharge time during the total charge/discharge cycles, minutes | 1,200 |
| Coulombic cyclic efficiency (100 × discharge time/charge time) | |
| Lifetime average, % | 78 |
| Maximum, % | 93 |

These results show that this invention cell can be discharged at practical current drain rates and recharged repeatedly.

The solubility of cupric sulfide in dimethylformamide was determined to be 71 parts per million as follows:

A sample in amount substantially in excess over the above solubility value was vigorously agitated with 100 milliliters of the solvent for 20 hours in a closed container, the mixture filtered by gravity through Whatman No. 5 filter paper, the filtrate digested and the copper content determined colorimetrically.

LiPF$_6$ Criticality

To demonstrate electrolyte criticality, cells were prepared essentially as described above except that LiPF$_6$ was replaced by comparably conductive amount of solute not of this invention as tabulated below, with the following results:

| | | Lifetime total | | |
|---|---|---|---|---|
| Comparative example | Solute | Discharge, minutes | Average cycling efficiency, percent | Charge/discharge cycles |
| A | LiCl | 48 | 39 | 8 |
| B | LiBr | 22 | 18 | 9 |
| C | LiI | 46 | 50 | 8 |
| D | LiSCN | 59 | 95 | 10 |
| E | LiClO$_4$ | 129 | 98 | 39 |
| F | KPF$_6$ | 5 | | 0 |

The invention cell combines good cycling efficiency and the ability to be recharged repeatedly with relatively long total and average discharge lifetimes, the average being 1200/31=39 minutes in example 1. Although some noninvention cells show good cyclic efficiencies and can be recycled, their discharge lifetimes are much shorter, averaging 6 minutes or less a cycle.

Examples 2-6

Cells were prepared essentially as described in example 1 except that the cupric sulfide was replaced by an equal weight of another copper compound as the cathode oxidant, with results as tabulated below:

| | | Lifetime total | | |
|---|---|---|---|---|
| Example | Cathode oxidant and solubility in DMF (p.p.m.) | Discharge, minutes | Cycling efficiency, percent | Charge/discharge cycles |
| 2 | Cupric ferrocyanide, Cu$_2$Fe(CN)$_6$ (29). | 673 | 79 | 161 |
| 3 | Basic cupric carbonate, CuCO$_3$·Cu(OH)$_2$ (.7). | 1,895 | 90 | 144 |
| 4 | Cuprous sulfide, Cu$_2$S (63). | 838 | 60 | 51 |
| 5 | Cuprous oxide, Cu$_2$O (2). | 1,110 | 85 | 55 |
| 6 | Cupric oxide, CuO (3). | 1,704 | 86 | 132 |
| Comparative: | | | | |
| H | Cupric fluoride, CuF$_2$ (480). | 0 | | 0 |
| I | Copper sulfate, CuSO$_4$ (19,000). | 86 | 44 | 5 |
| J | Cupric chloride, CuCl$_2$>>(80,000). | 10 | | 0 |
| K | Cupric bromide, CuBr$_2$>>(100,000). | 10 | | 0 |

In addition to the copper compounds in examples 2-6, cupric hydroxide and cupric metaborate Cu(BO$_2$)$_2$ are operable cathode depolarizers.

It should be noted that the CuF$_2$ cell when first prepared registered 2.9 volts on open circuit. This soon decayed to 0.9. Its inability to be recharged agrees with prior disclosures that CuF$_2$ is suitable for primary cell use only (Braeuer and Harvey, Power Sources Division/Electronics Components Laboratory, DA TASK 1CO 14501 A 34A-00-01/U.S. Army Electronics Command Fort Monmouth, N.J., May 1967).

The results clearly show that the copper oxidants of examples 2-6 are markedly superior to those outside the invention scope.

Examples 7-9

Cells were prepared essentially as described in example 1 except that dimethylformamide was replaced by solvent as tabulated below:

| | | Lifetime total | | |
|---|---|---|---|---|
| Example | Solvent | Discharge, minutes | Cycling efficiency, percent | Cycles |
| 7 | N,N-dimethyl acetamide. | 257 | 65 | 59 |
| 8 | Dimethyl sulfoxide | 284 | 85 | 43 |
| 9 | Acetonitrile | 167 | 63 | 50 |
| Comparative: | | | | |
| L | Acetic anhydride* | 10 | | 0 |
| M | Isopropylamine | 37 | 29 | 6 |

*Substantially identical results are obtained with LiClO$_4$ as solute in acetic anhydride.

Comparative Example 10

Example 1 was repeated except that the lithium-on-aluminum anode was replaced by a sheet of lithium metal. The cell had an open circuit voltage of 3.30 and exhibited an extended discharge capability. Under the example 1 conditions it discharged at a 200 ma. drain for 66 minutes before the voltage dropped to 1.5. It could not be cycled under the indicated conditions, however, and is thus only suitable for primary battery use.

Example 11

A sheet cathode cell was assembled as follows: A 0.1 cm. thick sheet cathode (prepared as described below containing 11 percent weight cupric ferrocyanide, 32 percent polytetrafluoroethylene and 32 percent carbon black, and presenting 100 cm.$^2$ active electrode area), a 0.32 cm. aluminum backup sheet and a 0.51 cm. copper contact sheet, all arranged as illustrated in FIG. 3, were preassembled by inserting a nylon machine screw in each hole. The cathode assembly was placed in a storage chamber under an argon atmosphere while a lithium-on-aluminum anode was prepared as described in example 1. With the plating completed, the plating electrolyte was displaced from the plating cell by argon, and the plating cell, together with an aluminum plate, silicon rubber gasket and polyethylene screen (all having the dimensions described for FIG. 1) were placed in the argon chamber with the cathode assembly. The plating cell was dismantled in the argon atmosphere, the anode was wiped dry and the components were arranged in the order 10, 12, 16, 14, 20, 50, 36 and 38 with reference to FIGS. 1 and 3. The cell was assembled by bolting and removed from the argon chamber. A lithium hexafluorophosphate (4.1 grams) solution in dimethylformamide (16.2 cc.) was injected into the electrolyte chamber by inserting a hypodermic syringe needle through the gasket wall. At the same time, the argon atmosphere of the cell was displaced into a second empty syringe likewise penetrating the gasket wall. This cell had an open circuit potential of 3.0 volts and a closed circuit potential of 2.5 volts after 4 minutes discharge at 200 ma. The cell was recharged in 4 minutes at 200 ma. to a 3.6 volt closed circuit potential, allowed to stand on open circuit (3.25 volts) for 4 minutes, then subjected to 69 200-ma. cycles, involving 1 minute charge and 1 minute discharge, during which time the minimum discharge voltage was 2 and the maximum 3.8 volts. These were followed by deeper discharge cycles between 0.8 volts (discharged state) and 4 volts (charged state) at 200 ma. as follows: The cell was discharged for 22.5 minutes, charged for 20.2 minutes, discharged again for 17.3 minutes and recharged in 14.0 minutes with an average coulombic cycling efficiency of 85 percent.

The sheet cathode used in this example was prepared as follows:

Ten parts by weight of a powdered polytetrafluoroethylene wire coating resin having an average particle size of 500±150 microns and melting at 327±10° C. was mixed with 90 parts by weight of a granular polytetrafluoroethylene molding and extrusion resin having a particle size of about 35 microns. This mixture (18.9 volume percent) was then blended in a Waring blender with the conductive furnace black of example 1 (70.5 volume percent), cupric ferrocyanide (10.9 volume percent) and Stoddard solvent (sufficient to give a wet filter cake), and filtered. The filter cake was transferred to a rubber mill and milled with the rollers at 55° C. The mill roller opening was progressively decreased until substantially all the naphtha had evaporated and the milled mass formed a coherent sheet. The sheet was removed, folded and milled with the roller opening initially set at 0.2 cm. The sheet was again removed, folded and passed through the mill with the roller opening slightly decreased. This was repeated until the sheet was 0.1 cm. thick. The rollers were then heated to 165° C. and the sheet cathode mass was remilled as before starting with 0.2-cm. opening, then progressively decreasing the roller opening until the sheet thickness was 0.1 cm. The sheet was then heated in an oven at 340° to 360° C. for 1 hour.

Example 12

Paste cathodes of nickel sulfide and copper tartrate were prepared substantially as was the copper sulfide cathode of example 1. Example 10 (pure Lithium anode) was repeated using the new cathodes:

| Cathode depolarizer | Cathode conductor | Lifetime total | | |
|---|---|---|---|---|
| | | Discharge, minutes | Average cycling efficiency, percent | Charge/discharge cycles |
| NiS | Ni sheet | 54 | 0 | 0 |
| $Cu_4CH_4O_6$ | Cu sheet | 78 | 96 | 7 |

These data indicate (a) that nickel sulfide in an effective cathode depolarizer, (b) that the couple Li/NiS has a long discharge time under load and (c) that with copper tartrate some reversibility is attained even with lithium metal.

Example 13 (Copper organic salts as cathode depolarizer)

Cells were prepared essentially as in example 1 except that an equal weight of a copper salt of a polycarboxylic acid was used as the cathode depolarizer.

| Cathode oxidant and solubility in DMF (p.p.m.) | Lifetime total | | |
|---|---|---|---|
| | Discharge, minutes | Cycling efficiency, percent | Charge/discharge cycles |
| Cupric oxalate (6) | 1,630 | 86 | 63 |
| Cupric citrate (5) | 2,220 | 88 | 120 |
| Cupric tartrate (35) | 2,339 | 90 | 86 |

The above cells are similar to the cell of example 1 in both discharge and recharge.

Example 14 (FeS, NiS, Ni(COO)$_2$ and S° as cathode depolarizers)

Paste cathodes of ferrous sulfide, nickel sulfide, nickel oxalate and elemental sulfur were prepared essentially as the copper sulfide paste cathode of example 1, except that the conductor sheets or screens were respectively iron, nickel and platinum. Cells prepared as in example 1 gave the following results.

| Cathode oxidant and solubility (p.p.m.) | Lifetime total | | |
|---|---|---|---|
| | Discharge, minutes | Cycling efficiency, percent | Charge/discharge cycles |
| Ferrous sulfide (8)[1] | 626 | 95 | 220 |
| Nickel oxalate (70) | 167 | 80 | 23 |
| Nickel fluoride [1] | 570 | 80 | 23 |
| Nickel sulfide (44)[1] | 3,080 | 96 | 459 |
| Sulfur (2,000)[2] | 2,300 | 90 | 730 |
| Do.[3] | 2,740 | 90 | 685 |

[1] In these cells the maximum charge cutoff voltages were 2.7 for FeS and NiF$_2$ and 3.0 for NiS; the discharge cutoffs were at 0.8 and 1.0 volt respectively. Cutoff voltages less than the more usual 3.5 and 1.5 volts were found necessary for good cel performance with FeS, NiF$_2$ and NiS oxidants.
[2] A 1:1 weight ratio of powdered sulfur to carbon black.
[3] A 4:1 weight ratio of powdered sulfur to carbon black.

The above results show that cathode depolarizers other than copper compounds are also very effective.

Example 15 (Propylene carbonate replaces DMF)

Two cells were prepared essentially as the cell of example 1 except that propylene carbonate and propylene carbonate diluted with benzene replaced the N,N-dimethylformamide.

| Electrolyte | Discharge, minutes | Cycling efficiency, percent | Charge/discharge cycles |
|---|---|---|---|
| Propylene carbonate +20 wt. percent LiPF$_6$[1] | 236 | >95 | 42 |
| Propylene carbonate 58 wt. percent benzene 28 wt. percent, LiPF$_6$ 15 wt. percent | 3,260 | 91 | 1,830 |

[1] The nylon screen of FIG. 2 was replaced with a polyester screen substantially identical in dimensions to the nylon screen. Pure propylene carbonate attacks nylon.

Methyl acetate and methyl formate may also be effectively employed as solvents for electrolyte salts.

The foregoing description has been given for clearness of understanding only and no unnecessary limitations are to be understood therefrom. The invention is not limited to the exact details shown and described, for obvious modifications will occur to those skilled in the art.

What is claimed is:

1. A voltaic cell comprising a lithium-aluminum alloy anode said alloy consisting essentially of lithium alloyed with aluminum and containing from 1 to about 20 percent by weight of lithium and having a reduction potential of at least about 0.2 volts less than lithium metal, an electrolyte comprising a substantially neutral inert solvent containing lithium hexafluorophosphate in an amount sufficient to provide a conductivity of at least about 0.001 ohm$^{-1}$cm.$^{-1}$, and a reversibly reducible cathode depolarizer selected from metal compounds and elemental sulfur.

2. The voltaic cell of claim 1 wherein the electrolyte solvent is N,N-dimethylformamide.

3. The voltaic cell of claim 1 wherein said cathode depolarizer is elemental sulfur.

4. The voltaic cell of claim 1 wherein said cathode is a porous, electrolyte permeable, sheetlike structure comprising a mixture of (a) at least one of said cathode depolarizers in particular form; (b) a particulate electrical conductor; and (c) a normally solid, electrolyte insoluble, electrochemically inert polymeric filler in an amount sufficient to form a self-supporting sheet, said sheet being in electrical contact with a metal conductor.

5. The voltaic cell of claim 4 wherein said polymeric filler is polytetrafluoroethylene.

6. The voltaic cell of claim 5 wherein said particulate electrical conductor is carbon black.

7. The voltaic cell of claim 1 wherein said cathode is an electrically conductive paste comprising (a) at least one of said cathode depolarizers in particulate form; (b) particulate, conductive carbon black; and (c) lithium hexafluorophosphate electrolyte as defined in claim 1, said paste being in contact with a conductive material.

8. The voltaic cell of claim 7 wherein said electrolyte composes from about 50 to 90 percent by weight of said paste and wherein said cathode depolarizer and carbon black each compose at least about 1 percent by weight of the paste.

9. The voltaic cell of claim 1 wherein the solubility of the metal compounds of the cathode depolarizer in the electrolyte solvent at 25° C. is less than 200 p.p.m. by weight.

10. The voltaic cell of claim 9 wherein said metal compounds of the cathode depolarizer are selected from the group consisting of cuprous oxide, cupric oxide, cuprous carbonate, basic cupric carbonate, cupric ferrocyanide, cupric sulfide, cupric oxalate, cupric tartrate, cupric citrate and mixtures thereof.

11. The voltaic cell of claim 9 wherein said cathode depolarizer is selected from the group consisting of nickel sulfide, nickel fluoride and nickel oxalate.

12. The voltaic cell of claim 9 wherein said cathode depolarizer is ferrous sulfide.

13. The voltaic cell of claim 12 wherein said cathode is a self-supporting sheet of ferrous sulfide.

14. A rechargeable voltaic cell consisting essentially of:

A. a lithium-aluminum alloy anode having a reduction potential of at least 0.2 volts less than lithium metal;
B. an electrolyte comprising N,N-dimethylformamide containing from about 15 to about 24 percent by weight of lithium hexafluorophosphate; and
C. a cathode comprising a conductive material in electrical contact with a cathode depolarizer selected from the group consisting of a copper oxide, a copper sulfide, a copper carbonate, cupric ferrocyanide, cupric oxalate, cupric tartrate, cupric citrate, ferrous sulfide, nickel sulfide, nickel fluoride, nickel oxalate and sulfur.

15. The voltaic cell of claim 14 wherein said cathode depolarizer is in the form of a paste or self-supporting sheet.

* * * * *